Oct. 25, 1966 A. T. ANDERSON 3,281,743
VIBRATION SENSING TRANSDUCER
Filed Sept. 1, 1964 2 Sheets-Sheet 1
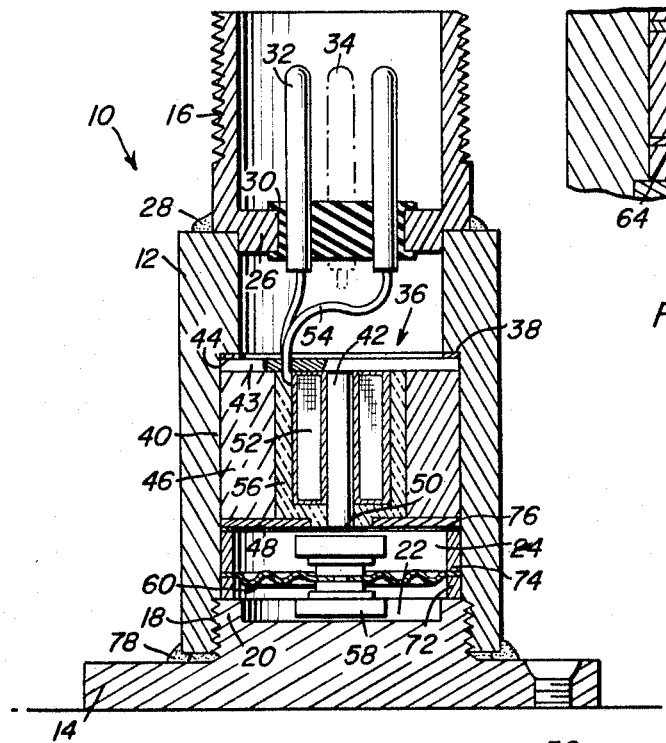
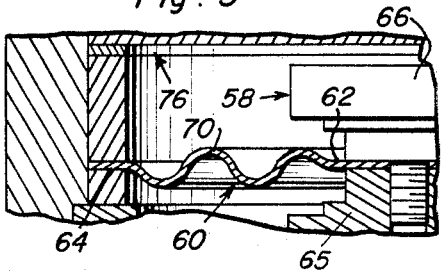
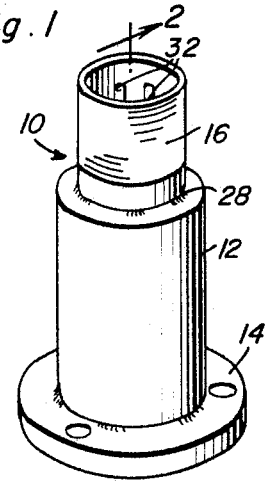
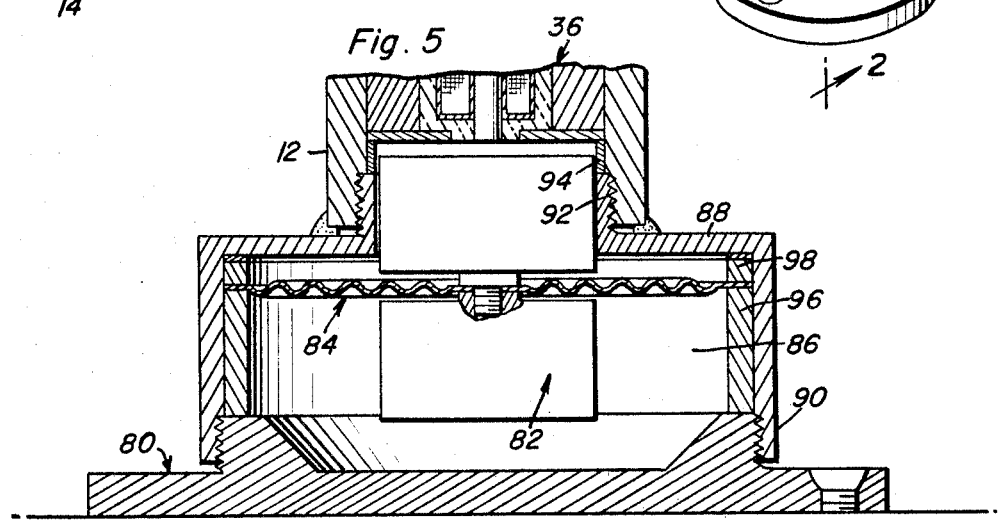
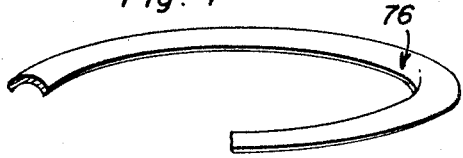
Albert T. Anderson
INVENTOR.

Oct. 25, 1966  A. T. ANDERSON  3,281,743
VIBRATION SENSING TRANSDUCER
Filed Sept. 1, 1964  2 Sheets-Sheet 2
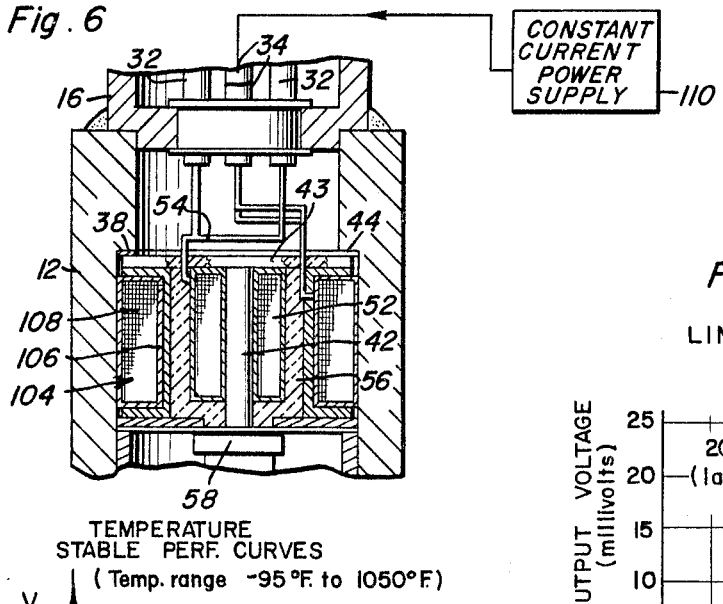
Fig. 6
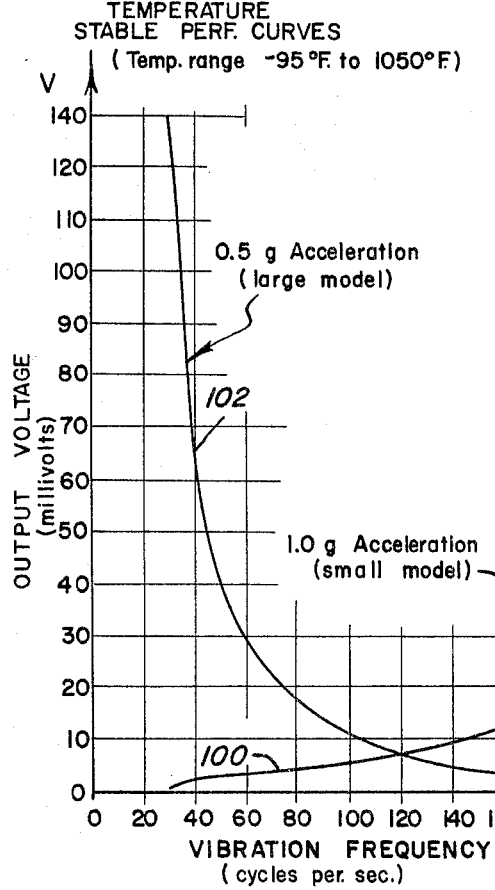
Fig. 8
LINEARITY TEST CURVES
Fig. 7
TEMPERATURE STABLE PERF. CURVES
(Temp. range −95°F. to 1050°F.)
Albert T. Anderson
INVENTOR.
BY Clarence A. O'Brien
and Harvey B. Jacobson
Attorneys

United States Patent Office 3,281,743
Patented Oct. 25, 1966

3,281,743
VIBRATION SENSING TRANSDUCER
Albert T. Anderson, % ATA Engineering Co.,
P.O. Box 4044, Inglewood, Calif.
Filed Sept. 1, 1964, Ser. No. 393,676
12 Claims. (Cl. 336—30)

This invention relates to a new and useful vibration sensing transducer which is particularly useful in connection with a high temperature accelerometer.

The transducer of the present invention because of its novel construction, arrangement of parts and selection of materials, is endowed with certain features and characteristics which are highly desirable in connection with modern day technology instrument requirements. Accordingly, the transducer of the present invention in addition to exhibiting endurance and stability characteristics, also exhibits response and linearity characteristics which remain substantially unchanged over a wide temperature operating range. The accelerometer transducer of the present invention is capable of operating within a temperature range of —95° F. to 1,050° F. Satisfactory operation of the transducer within the aforementioned temperature range is therefore one of the primary objects of the present invention.

An additional object of the present invention is to provide a relatively lightweight, hermetically sealed transducer unit designed to measure vibration within predetermined ranges of acceleration of magnitude and frequency, producing measurable outputs which are stable and reproducible for given acceleration and frequency conditions.

In accordance with the foregoing objects, a further object of the present invention is to provide a vibration sensing transducer which features a novel spring suspension for a vibratory mass through which the flux gap of a magnetic circuit is varied in response to vibration of the mass. The spring suspension restricts vibration of the mass to a single sensitivity direction and also prevents tilting or deviation of the mass from its vibratory path so as to maintain a uniform output from the transducer.

An additional object of the present invention is to provide a transducer construction wherein the magnetic circuit assembly is fixedly mounted within the housing of the transducer between temperature compensating annular spring spacers cooperating with a symmetrically mounted and balanced flux gap varying mass.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of one form of transducer unit made in accordance with the present invention.

FIGURE 2 is a longitudinal sectional view taken substantially through a plane indicated by section line 2—2 in FIGURE 1.

FIGURE 3 is an enlarged partial sectional view of a portion of the transducer showing the spring suspension mounting of the vibratory mass.

FIGURE 4 is a perspective view of a disassembled part of the transducer.

FIGURE 5 is a partial sectional view showing a modified form of transducer.

FIGURE 6 is a partial sectional view showing another modified form of transducer.

FIGURES 7 and 8 are graphical illustrations showing the performance of the transducer units respectively illustrated in FIGURES 2 and 5.

Referring now to the drawings in detail, the transducer unit generally denoted by reference numeral 10 in FIGURE 1, constitutes a hermetically sealed, self-generating accelerometer weighing approximately 3½ ounces and operative within a temperature range of from —95° F. to 1,050° F. The unit 10 thus constitutes a voltage source having an internal impedance of 250 ohms with a nominal output of 20 millivolts and designed to measure vibrations up to 25 g. from 20 to over 400 cycles per second. The voltage producing components of the transducer are housed within the cylindrical body member 12 assembled on a mounting flange 14 which is adapted to be secured to the surface being sensed. An externally threaded connector portion 16 projects axially from the cylindrical body 12 through which electrical connections are made whereby the electrical output of the transducer may be monitored.

Referring now to FIGURE 2 in particular, it will be observed that the cylindrical body 12 of the transducer includes adjacent one axial end, an internally threaded portion 18 whereby the body is threadedly mounted on the axially projecting assembly portion 20 of the mounting flange. The assembly portion 20 of the mounting flange is therefore externally threaded and is formed with a recess 22 closing one end of a cavity 24 formed within the body 12. Both the mounting flange and the body are preferably made of a stainless steel. Secured to the axial end of the body 12 opposite the mounting flange, is the connector portion 16. The connector portion is therefore provided with an annular shoulder portion 26 secured to the axial end of the body by welding 28 and provided with an opening within which a nonconductive grommet 30 is received. Projecting through the seal 30, are a pair of output terminal connectors 32. Another set of terminal connectors 34 may be provided, shown inactive in FIGURE 2. The output terminal connectors 32 are therefore electrically connected to a magnetic circuit assembly generally referred to by reference numeral 36 from which an electrical output is derived in response to vibration imparted to the unit by the surface to which the mounting flange is secured. The electrical output so generated by the transducer unit 10 will reflect the acceleration and frequency characterizing the vibration.

The magnetic circuit assembly 36 is fixedly housed within the body 12 and toward this end, the body is formed with an internal thrust shoulder 38. Concentrically located within the bore portion 40 of the body, is a soft iron core 42 constituting a flux conducting member and having a circular flange portion 43 which is seated against an annular spring spacing element 44 which in turn is seated on the thrust shoulder 38. A source of magnetic flux in the form of an annular permanent magnet 46 is axially positioned between the flux conducting flange portion 43 and an annular soft iron pole face element 48 nonmagnetically spaced from the axial end 50 of the core 42 opposite the flange portion 43. A pickup coil assembly 52 is mounted about the core 42 so that variations in the flux density of the flux conducted through the core will induce a voltage in the coil assembly. The voltage so induced will therefore appear across the output terminal connectors 32 electrically connected to the coil assembly by the insulated conductors 54 extending through the flange portion 43. The spacing between the pickup coil assembly 52 and the internal surface of the permanent magnet 46 is filled with a ceramic potting compound 56 so as to nonmagnetically space the coil assembly 52 from the permanent magnet. It will therefore become apparent, that the flux emanating from the annular permanent magnet 46 will be conducted through the element 48 across a flux gap within the cavity 24 so that the flux may be conducted through the core 42 in order to complete the flux path. The reluctance of the flux path and variation of the flux density through the core 42 will determine the strength of the magnetic field within the cavity 25 and output voltage generated in the coil assembly 52.

The output from the transducer will therefore be a function of the flux gap variation. Accordingly, a vibration sensing mass 58 is movably mounted within the cavity 24, the mass being made of a material having a high magnetic permeability so as to conduct the flux therethrough. The mass 58 is therefore mounted by a spring suspension member generally referred to by reference numeral 60 so as to accommodate vibratory movement of the mass in a single sensitivity direction parallel to the longitudinal axis of the body 12.

Referring now to FIGURE 3 in particular, it will be observed that the spring suspension member 60 is generally circular and includes a radially inner, flat anchor portion 62 and a radially outer flat anchor portion 64. The radially inner anchor portion 62 is secured to the vibratory mass 58 which is made up of two sections 66 and 65. The section 65 may therefore be secured to the section 66 by means of an axially projecting portion 68 which extends through the center of the spring suspension member 60 so that the anchor portion 62 will be clamped between the sections 65 and 66. The sections of the mass are also balanced and symmetrically disposed on opposite sides of the spring suspension member so as to avoid tilting or any deviation in the movement of the mass from a direction alined with the longitudinal axis of the body 12. Therefore, the radially inner and outer anchor portions 62 and 64 of the spring suspension member, are disposed within a common plane when the mass is in its center or equilibrium position, midway between the limits of its excursions. The anchor portions are interconnected by a connecting portion 70 having a plurality of concentric convolutions which project by equal amounts from opposite sides of the common plane aforementioned extending through the anchor portions 62 and 64. The radially outer anchor portion 64 is secured to the body 12 in order to suspend the mass 58 within the cavity 24. The foregoing construction of the spring suspension member compensates for temperature losses caused by an increase in the resistance of the copper conductor within the coil assembly 52 and a reduction in the strength of the magnet 46 at high temperatures. The compensating action of the spring suspension results from the reduction in its stiffness in view of the concentric convolutions or rings forming the connecting portion 70. Also, the material selected for the spring suspension member has a relaxation quality at high temperatures allowing an increased excursion of the vibratory mass in order to compensate for the reduction in the output of the transducer caused by the increased copper resistance and loss in strength of the magnet as aforementioned. One type of such material found particularly suitable is a metal alloy known as "Inconel X-750" which is a high nickel-chromium iron alloy. After the spring suspension member is formed from such material, it is heat-treated with a white-yellow flame well above 2000° F. The material then becomes more compliant with increases in temperature thereof in order to effect the aforementioned compensation.

Referring once again to FIGURE 2, it will be observed that the spring suspension member is anchored within the cavity 24 between the relatively rigid, annular spacers 72 and 74. The spacer 72 abuts against the projecting assembly portion 20 of the mounting flange while the spacer 74 is spaced from the annular element 48 of the magnetic circuit assembly by means of an annular spring spacing element 76 which is similar in construction to the annular spring spacing element 44 aforementioned. The spring spacing elements 76 and 44 in their undeformed state, are curved in cross section as shown in FIGURE 4. When the body 12 is assembled on the mounting flange, the spring spacing elements 44 and 76 will be deformed to a flat condition and held in such condition as long as the transducer is maintained assembled. Accordingly, welding 78 is applied to hold the parts assembled with the spacing spring elements 44 and 76 in the flat condition shown in FIGURES 2 and 3. The spring spacing elements firmly center the assembly 36 in position and prevent looseness between the parts at the high temperature extremes resulting from thermal expansion. The thickness of the spring spacing elements may also be selected in order to obtain a uniform output from the transducer inasmuch as increasing of the thickness will increase the flux gap and thereby reduce the output. The ability of the spring spacing elements to compensate or assist in compensating for thermal expansion is apparent from the fact that the spring spacing elements are deformed in an axial direction parallel to the single sensitivity direction of the transducer.

In FIGURE 5, a transducer having different measuring characteristics is formed by utilizing a larger mounting flange 80 and employing a larger vibration sensing means 82 with a correspondingly larger spring suspension member 84. Accordingly, a larger cavity 86 is formed between the body 12 axially spaced from the mounting flange by means of an adapter member 88. The adapter member therefore includes a large diameter, internally threaded portion 90 threadedly mounted on the mounting flange and a smaller diameter, externally threaded portion 92 on which the body member 12 is threadedly mounted. The rigid spacer 94 therefore abuts against the externally threaded portion 92 of the adapter 88 in order to hold the magnetic circuit assembly 36 assembled within the body member. The spring suspension member 84 on the other hand, is clamped within the cavity 86 between the spacers 96 and 98. The construction and operation of the transducer described in connection with FIGURE 5 is otherwise similar to that of the transducer 10 described in connection with FIGURE 2. It will, however, be apparent that because of the differences in the size and weight of the masses and suspension springs, different output characteristics will be produced by the small transducer 10 and the enlarged version illustrated in FIGURE 5.

Referring now to FIGURES 7 and 8, the performance of the transducers constructed in accordance with the present invention, will be apparent from the curves derived from actual tests conducted. The curve 100 for the transducer 10 indicates a resonant frequency above a given pass band with a rising characteristic below resonance. The curve 102 corresponding to the form of transducer described with respect to FIGURE 5, has a resonant frequency below the pass band and a flat characteristic within the pass band or operating frequency range so that the output is then proportional to the displacement for any frequency within the pass band. The curves illustrated in FIGURE 8 further demonstrate substantial linearity in connection with the transducers.

Referring now to FIGURE 6, another form of transducer is illustrated which is similar in construction and operation to the transducer 10 described with respect to FIGURE 2 except that the flux emitting element of the magnetic circuit assembly is replaced by an electromagnetic coil assembly 102. The transducer illustrated in FIGURE 6 is therefore not of the self-generating type. The electromagnetic coil assembly 104 therefore includes a spool element 106 having internal and external dimensions identical to that of the permanent magnet 46 described in connection with FIGURE 2. Mounted on the spool assembly, is an annular coil winding 108 electrically connected through the terminal connectors 34 to a constant current power supply 110 of any suitable type. Various constant current sources are available for this purpose such as a pentode vacuum tube, or transistor current devices operative to supply the constant current from a D.C. voltage source or from an A.C. voltage source through a simple rectifier and filter arrangement. The advantage of a constant current power supply and electromagnetic assembly over the use of a permanent magnet is that variations in field strength at the temperature extremes are reduced. Inasmuch as the ampere-turns associated with coil assembly 102 remains constant, the influence of variables such as magnetic reluctance and coil resistance are removed in connection with the generation of magnetic flux so as to require less temperature compensation.

It will be appreciated from the foregoing that by using a smaller mass 58 and a stiffer or thicker spring 60, the resonant frequency may be raised permitting higher useful frequencies within a given pass band extending curve 100 to the right as shown in FIGURE 7. Also, versions of the transducer could be made for handling forces of 100 g or higher. If desired, magnetic damping could be provided by placement of a ring magnet about the mass 58 or 82 within the cavity closed by flange 14 or 80.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vibration sensing transducer comprising, an external mounting flange adapted to be secured to a surface, a body member fixedly assembled on said mounting flange forming a cavity closed at one end by the mounting flange, an internal source of magnetic flux mounted within the body member in fixed spaced relation to the mounting flange, a flux conducting core connected to said source, a magnetically permeable mass movably mounted within said cavity completing a magnetic flux path across a flux gap between the source of magnetic flux and the core, spring suspension means mounting the mass within said cavity for vibratory movement transferred thereto from the mounting flange to vary the flux gap and reluctance of the magnetic flux path, and sensing coil means mounted on the core in non-magnetically spaced relation to the internal source of flux for conducting electrical current generated only in response to vibration of said mass, said spring suspension means being made of material, the vibration amplitude of which increases with an increase in the temperature thereof.

2. The combination of claim 1 wherein said source of magnetic flux is a permanent magnet.

3. The combination of claim 1 wherein said body member includes, an internal axial thrust portion for axially positioning the source of magnetic flux when the body member is assembled on the mounting flange, an axial thrust washer disposed on one axial side of the source of magnetic flux opposite said axial thrust portion of the body member, and annular spring means disposed between the magnetic flux and the axial thrust portion in an elastically deformed state to dimensionally compensate for thermal expansion in said one sensitivity direction.

4. The combination of claim 3 wherein said source of magnetic flux comprises, an electromagnetic coil assembly and a constant current power supply electrically connected to said coil assembly.

5. A vibration sensing transducer comprising, a mounting flange having an axially projecting assembly portion, a hollow body operatively assembled on said assembly portion of the mounting flange, said body having an internal thrust shoulder axially spaced from the assembly portion, a magnetic circuit assembly fixedly mounted within the body forming a cavity with the assembly portion within which a flux gap is established, vibration sensing means operatively mounted within the cavity, rigid spacer means disposed between the assembly portion and the magnetic circuit assembly, and elastically deformed spacing spring means yieldably centering the magnetic circuit assembly between the spacer means and the internal thrust shoulder for regulating the flux gap.

6. The combination of claim 5 including an adapter member assembling the body on the assembly portion in axially spaced relation thereto.

7. A transducer comprising a tubular body, an inertia mass enclosed within the body, an elastic diaphragm mounting the inertia mass for vibration within the body, said diaphragm having a thermal relaxation characteristic increasing the vibration amplitude of the mass with increase in temperature, vibration transmitting means connected to the tubular body spaced from the inertia mass for transferring vibration inducing accelerating force thereto, vibration sensing means axially spaced by a gap from the inertia mass for producing an electrical output in response to vibration thereof, and temperature compensating spacer means mounted in an elastically deformed state within the tubular body for positioning the vibration sensing means in variably spaced relation to the elastic diaphragm to establish a substantially linear relationship between said electrical output and the accelerating force or vibration band pass frequency of the mass at all temperatures between extreme temperature limits.

8. The combination of claim 7 wherein said spacer means comprises a pair of axially deformed spacer rings made of elastic material and respectively disposed in abutting relation between the vibration sensing means and the tubular body and between the vibration sensing means and the vibration transmitting means.

9. The combinaton of claim 8 wherein said vibration transmitting means comprises an external mounting flange secured to the tubular body and a pair of rigid spacers respectively abutting the compensating spacer means and the mounting flange for anchoring the diaphragm therebetween.

10. The combination of claim 9 wherein said vibration sensing means comprises a core, a sensing coil mounted on said core, an internal source of magnetic flux radially spaced in non-magnetic relation to the coil and the core, a flux conducting element interconnecting the core and the source of flux at one axial end remote from the inertia mass and a pole face element connected to the source of flux and spaced from the inertia mass by said gap.

11. The combination of claim 7 wherein said vibration transmitting means comprises an external mounting flange secured to the tubular body and a pair of rigid spacers respectively abutting the compensating spacer means and the mounting flange for anchoring the diaphragm therebetween.

12. The combination of claim 7 wherein said vibration sensing means comprises a core, a sensing coil mounted on said core, an internal source of magnetic flux radially spaced in non-magnetic relation to the coil and the core, a flux conducting element interconnecting the core and the source of flux at one axial end remote from the inertia mass, and a pole face element connected to the source of flux and spaced from the inertia mass by said gap.

References Cited by the Examiner

UNITED STATES PATENTS

| | | | |
|---|---|---|---|
| 2,440,605 | 4/1948 | Hathaway | 336—30 |
| 2,830,240 | 4/1958 | Speer | 317—173 X |
| 2,870,422 | 1/1959 | Gindes et al. | |
| 2,930,009 | 3/1960 | Cogley et al. | 336—134 X |
| 3,035,238 | 5/1962 | Bouchard et al. | 336—30 |
| 3,118,121 | 1/1964 | Travis | 336—30 |
| 3,153,935 | 10/1964 | Karlson | 336—30 X |

LEWIS H. MYERS, *Primary Examiner.*

ROBERT K. SCHAEFER, LARAMIE E. ASKIN,
*Examiners.*

D. J. BADER, *Assistant Examiner.*